May 3, 1938.  C. S. RUCKER  2,116,044
DEVICE FOR STRAINING AND FILTERING
Filed April 21, 1936
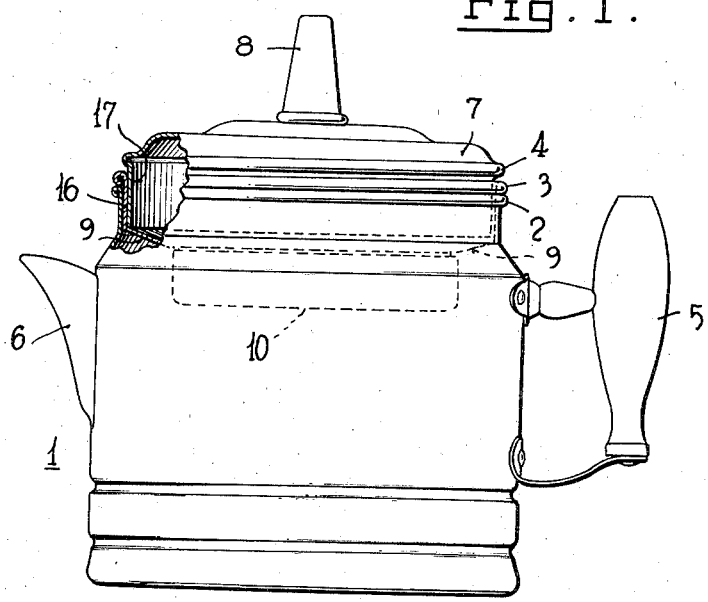
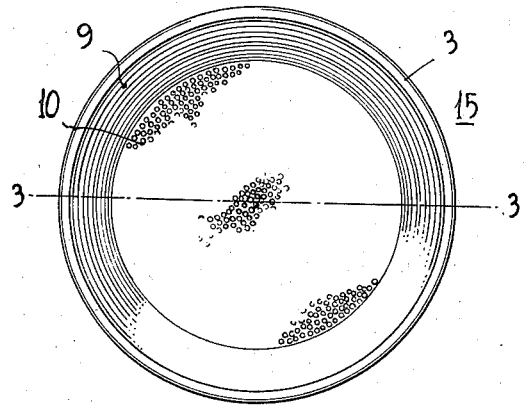
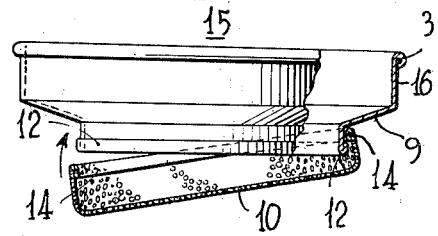
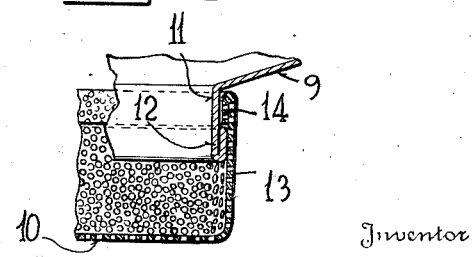
Inventor
Claude Sanford Rucker,
By
Attorneys Patented May 3, 1938

2,116,044

UNITED STATES PATENT OFFICE 2,116,044

DEVICE FOR STRAINING AND FILTERING

Claude Sanford Rucker, Washington, D. C.

Application April 21, 1936, Serial No. 75,607

5 Claims. (Cl. 210—155)

The present invention relates to improvements in devices for straining and filtering, and to a strainer-filter in combination with a specially constructed vessel.

The primary object of the invention is to produce an efficient strainer or filter and container for cooking fats and grease. It is the common practice of many housewives and cooks to strain fats and grease after use in cooking into a container, saving them for use at a later date. The device of this invention is designed to facilitate this operation by providing a finely perforated metal strainer-filter, which fits into the top of a specially constructed vessel through which hot used fats and greases may be poured to separate and cleanse them of any particles of cooked food or other solids or semi-solids. Further utility is provided by this device as a receptacle for fresh cooking fats, which are placed in the container while in liquid form and poured out in quantities as desired. However, no restrictions are intended as to the uses to which this device may be adapted inasmuch as it is designed to permit utilization as a strainer and container of general application.

Another object of this invention is to provide a filtering and straining device having a finely perforated metal strainer element containing substantially 620 perforations per square inch which is of general utility and economical in manufacture. To achieve these purposes this device is of a novel two-piece construction, the preferred form of which is shown in the accompanying drawing. This construction serves not only to furnish an improved strainer for general kitchen use, but also serves to permit its marketing at prices competitive with those of the wire screen and gauze strainers now in general use. The principal feature for achieving this object resides in fabricating the strainer by drawing the straining and filtering element to cup shape from a previously perforated metal sheet, and subsequently attaching it by an efficient, economical and easily produced joint to a supporting member or superstructure. In contrast to this, the drawing or shaping to the form of a one-piece article embodying both the straining element and supporting structure, the bottom of which must then be perforated, would involve a practically prohibitive and more expensive method. The material from which the straining element of the present device is made is preliminarily perforated in large sheets, and then joined to an imperforate support. The apparatus for this perforating operation is exceedingly expensive and wears out quickly, so that it is impractical to use it for small articles. It would, furthermore, be out of the question in commercial practice to perforate the annular walls of a one-piece article, where economy in manufacture is a prerequisite.

Still another object of this invention is to provide a finely perforated straining element superior in strength and durability to the wire screen and gauze utensils now in use. This is achieved not alone by the fact that it is composed entirely of sheet metal but also that it is of a novel two piece interlapping construction. The supporting member of the strainer has a centrally disposed opening therein and a circular perpendicular flange extending downwardly from the periphery of said opening, the lower edge of said flange being folded back upon itself to form a shoulder on the outside thereof. A similar shoulder is formed on the inside top edge of the upright wall of the perforated straining element, this shoulder being of such proportions as to pass, when forced, over the outturned shoulder on the lower flange of the supporting member and snap into engagement with the supporting member above the lower flange, thus securing the straining element in position and in addition reinforcing the annular walls thereof. This manner of engagement allows the filtering element to be removed for cleansing purposes. If it is so desired, however, this joint may be made permanent by a slight expansion of the perpendicular flange of the supporting member by exerting a force from within said flange. It is not necessarily intended that these perpendicular or upright, annular walls or flanges be absolutely vertical but that they extend only in a substantially perpendicular or upright direction.

Another object of this invention is to provide a straining and filtering device of the greatest degree of efficiency requiring as small a space as possible, thereby achieving not only economy in the cost of manufacture but also a compact straining and filter device capable of handling a maximum amount of fluids in proportion to the area of the topmost opening of the strainer proper. Rapid passage of fluids into and through the straining and filtering element is effected by the inclined shoulders of the supporting member together with the centrally depressed straining and filtering element which has a perforated annular wall and a perforated bottom.

With the foregoing and other objects in view, this invention embodies the features of construction, combination and arrangement of parts as will be hereinafter more fully described in detail, illustrated in the accompanying drawing, which discloses the preferred embodiment of the invention, and set out in the claims appended hereto.

In the accompanying drawing:

Figure 1 is a side elevation of the preferred embodiment of the device with a part thereof broken away to show the arrangement of parts thereof.

Figure 2 is a top plan view of the straining and filtering element and the supporting member.

Figure 3 shows in side elevation the supporting element of the strainer filter, the perforated filtering straining element and a part of the support being shown in section along the line 3—3 of Figure 2, the parts being illustrated in partly engaged relation.

Figure 4 is an enlarged sectional view of a portion of the strainer showing the mechanical features of the interlocking joint between the straining and filtering element and its support in detail.

The filter strainer is of two piece metal construction consisting of a centrally depressed finely perforated collecting and straining reservoir 10 mounted in a supporting member 15. In accordance with my invention the supporting member 15 for the straining element 10 is cylindrical in shape. The vertical wall 16 is provided at its upper edge with an outrolled peripheral rim 3 to rest upon the top rim 2 of the container 1. An inclined shoulder 9 extends inwardly from the lower edge of wall 16, and graduates into a perpendicular wall 11. The lower edge of wall 11 is outturned to form a rim or shoulder 12 of approximately $\frac{1}{32}$ inch thickness at the lower extremity thereof. The straining element is formed by stamping from a flat piece of finely perforated metal a cup-shaped element consisting of a bottom 18 and a vertical wall 13. The upright annular wall 13 is of slightly larger circumference at its topmost edge than that of the annular wall 11, and said topmost edge has an inturned peripheral rim or shoulder 14 of approximately $\frac{1}{32}$ inch thickness. The peripheral rims or shoulders 12 and 14 are of such size that when rim 14 of the straining element is forced over rim 12 of the supporting member it will snap into firm engagement with the annular groove formed between the shoulder 9 and rim 12. The straining and filtering element 10 is thus detachably mounted in the supporting member 15 and may be removed therefrom by exerting a pressure at any point within the annular wall 13 and causing relative movement between the two elements. If desired, the joint may be made permanent by expanding the wall 11 slightly.

The receiving and dispensing pot or container 1 is cylindrical in shape and is provided with a pouring spout 6 communicating with the interior through a plurality of perforations. The handle 5 is connected with the wall of the pot diametrically opposite the spout 6 for easy handling. This arrangement provides convenience in placing the pot when cold over a heating or cooking element for the purpose of warming the contents as necessary for liquifaction thereof. The cover 7 is of conventional design and is provided with a slightly projecting flange 4 arranged to rest on flange 3, a handle 8, and a downwardly extending flange 17 to fit loosely inside the top opening of the filter strainer.

While I have described herein one embodiment of my invention, I wish it to be understood that I do not intend to limit myself thereby except within the scope of the appended claims.

I claim:

1. A metal straining and filtering device comprising a cup-shaped supporting member having a centrally disposed opening in the bottom thereof, and a flange extending downwardly from the edge of said opening, the lower edge of said flange being bent outwardly back upon itself to form a shoulder on the outside thereof, and a straining and filtering element of perforated material having an annular flange bent upwards to form a circular wall, the upper edge of said wall being inturned and folded back upon itself to form a shoulder on the inside thereof, said shoulder being engaged above the shoulder on the supporting member.

2. A metal straining and filtering device comprising an annular supporting member having a centrally disposed opening therein, and a flange extending downwardly from the edge of said opening, the edge of said flange being bent outwardly back upon itself to form an annular shoulder on the outside thereof, a cup-shaped straining and filtering element of finely perforated sheet metal, the upper edge of said element being inturned and folded back upon itself to form a shoulder on the inside thereof, said shoulder being engaged above the shoulder on the supporting member.

3. A metal straining and filtering device comprising an annular metal supporting member, said supporting member having its upper edge outrolled to form a flange on the outside thereof, said supporting member having an inclined circular flange therein which terminates in a substantially perpendicular, cylindrical wall, the lower edge of said wall being outturned and folded back upon itself to form an annular shoulder on the outside thereof, and a straining and filtering element formed of one piece of metal perforated to the degree of substantially 620 perforations per square inch, said filtering element having an upturned circular flange, the upper edge of said flange being inturned and folded back upon itself to form a shoulder on the inside thereof having substantially the same inside diameter as the outside diameter of the shouldered cylindrical wall of the supporting member, said shoulder being tightly engaged between the inclined flange and the annular shoulder of the supporting member.

4. A straining and filtering device comprising an annular supporting frame, said supporting frame having an inclined circular shoulder therein which terminates in a substantially perpendicular, cylindrical wall, the lower edge of said wall being outturned and folded back upon itself to form an annular shoulder on the outside thereof, and a cup-shaped straining and filtering element of finely perforated metal, the upper edge of said element being inturned and folded back upon itself to form a shoulder on the inside thereof, said shoulder being engaged above the shoulder on the supporting member.

5. A straining and filtering device comprising a cylindrical container open at its upper end, an annular metal supporting member having an outrolled flange at the top thereof to engage with the upper edge of the cylindrical container, said supporting member having an inclined circular flange therein which terminates in a substantially perpendicular, cylindrical wall, the lower edge of said wall being outturned and folded back upon itself to form an annular shoulder on the outside thereof, and a straining and filtering element formed of one piece of finely perforated metal, said filtering element having an upturned circular flange, the upper edge of said flange being inturned and folded back upon itself to form a shoulder on the inside thereof, having substantially the same inside diameter as the outside diameter of the shouldered cylindrical wall of the supporting member, said shoulder being tightly engaged between the inclined flange and the annular shoulder of the supporting member.

CLAUDE SANFORD RUCKER.